Jan. 17, 1967   J. A. McDONALD   3,298,488
TORQUE LIMITING CLUTCH
Filed Sept. 29, 1964   2 Sheets-Sheet 1

Inventor:
James A. McDonald
By Darbo, Robertson &
Vandenburgh
Attys.

Jan. 17, 1967  J. A. McDONALD  3,298,488
TORQUE LIMITING CLUTCH
Filed Sept. 29, 1964  2 Sheets-Sheet 2
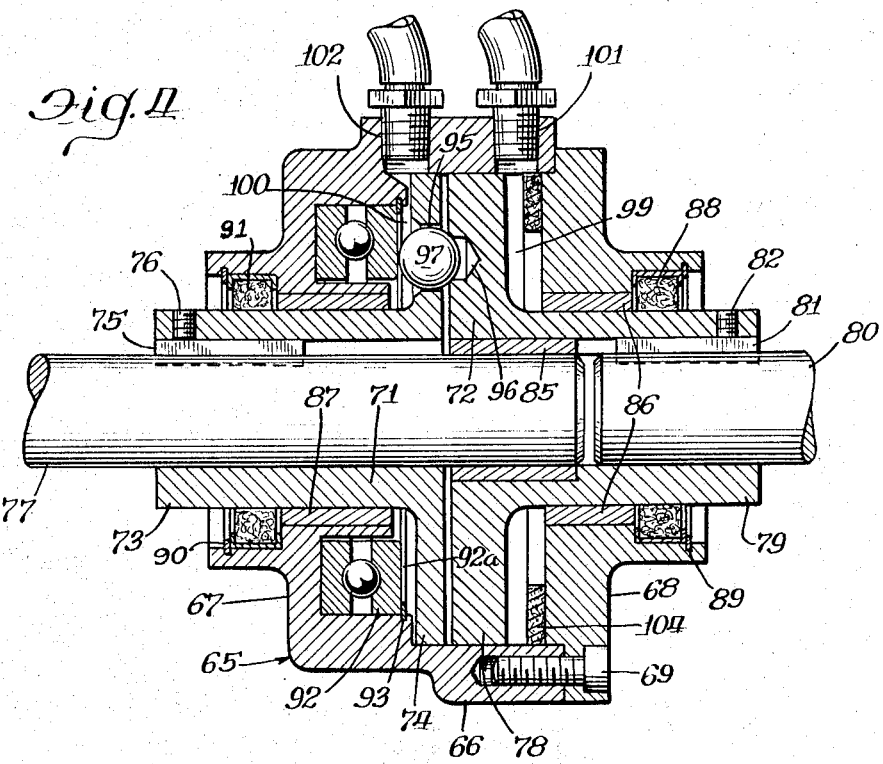
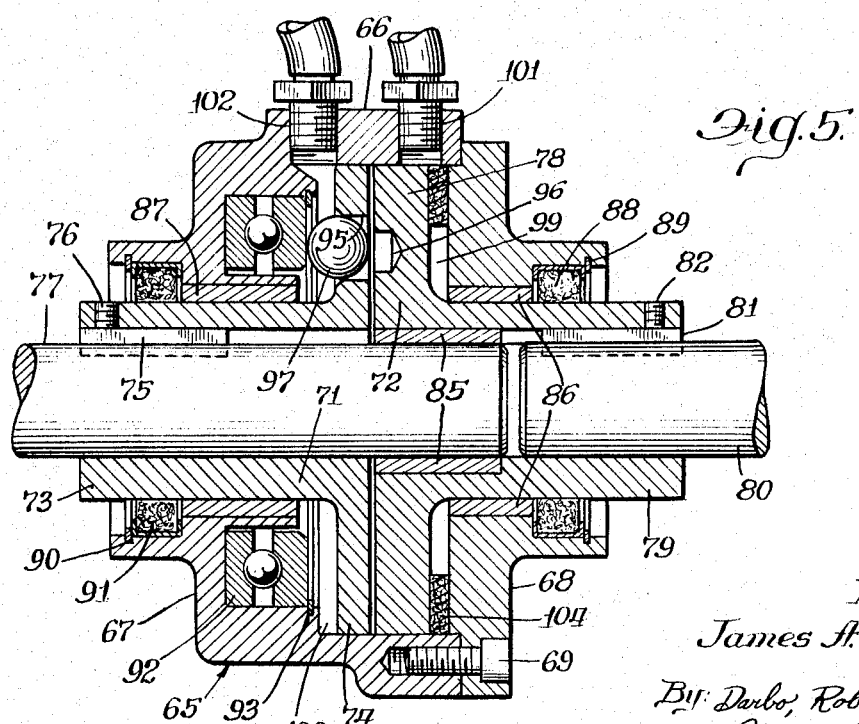
Inventor:
James A. McDonald
By Darbo, Robertson &
Vandenburgh
Attys.

United States Patent Office 3,298,488
Patented Jan. 17, 1967

3,298,488
TORQUE LIMITING CLUTCH
James A. McDonald, 5040 Harnew Road S.,
Oaklawn, Ill. 60453
Filed Sept. 29, 1964, Ser. No. 400,118
12 Claims. (Cl. 192—56)

The present invention relates to a torque limiting clutch having a positive disengagement upon the occurrence of an overload.

The prior art is replete with various types of torque limiting clutches using detents for normal power transmission. Upon the occurrence of an overload, the detents are unseated to permit relative rotation between the clutch parts and thus avoid damage to equipment. The present invention is directed to a clutch of this general type.

However, the structure is of such a nature that when disengagement occurs, there are not forces present tending to urge the detents back into seated position as is the case with most clutches of this type. In the present invention there is a positive disengagement of the clutch when the overload forces occur. The disengagement action is much more rapid than is generally the case with prior art devices.

One feature of the present invention is that no springs are used to maintain clutch engagement under normal operating conditions. This is one factor that contributes towards the rapid disengagement upon the occurrence of the overload. An advantageous complementary feature is that the structure for maintaining the detents in engagement renders the clutch more readily adjustable as to the extent of the torque required to cause clutch disengagement. With the type of clutches using springs it often is tedious, if not difficult, to vary the level of torque at which disengagement will occur. In the present invention, gas, e.g., air, pressure is employed for this purpose. It is very simple to change the amount of pressure and thus, change the torque required before clutch disengagement occurs.

A further feature of embodiments of the invention is that they may be employed for disengaging one piece of equipment from another under circumstances other than overload conditions. Thus they may be used in the manner of an ordinary plate or jaw clutch to disconnect one part of an apparatus from another. This is particularly important in the installation, repair and testing of machinery. Under such circumstances it may be desirable and oftentimes necessary to have one part of the equipment idle while working on another part. This is easily done with embodiments of the present invention.

Of course, the present invention can be made so that the two rotating parts connected by the clutch of the invention will always bear the same angular relationship to each other when power is being transmitted. This assures synchronism at all times between associated rotating parts. After a disengagement has taken place, either as a result of an overload or otherwise, the parts connected by the clutch will have the same angular relationship when power subsequently is again transmitted through the clutch.

Embodiments of the present invention are quite compact for their torque ratings. They are sturdy and reliable. Particularly because of the positive disengagement, there is not the battering and damage both to the clutch and to related machinery that often occurs with detent type overload clutches.

Further objects and advantages will be apparent from the following description taken in conjunction with the drawings in which:

FIGURE 4 is a sectional view of an alternative embodiment in engaged position;

FIGURE 5 is the embodiment of FIGURE 4 in disengaged position.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Figure 1:
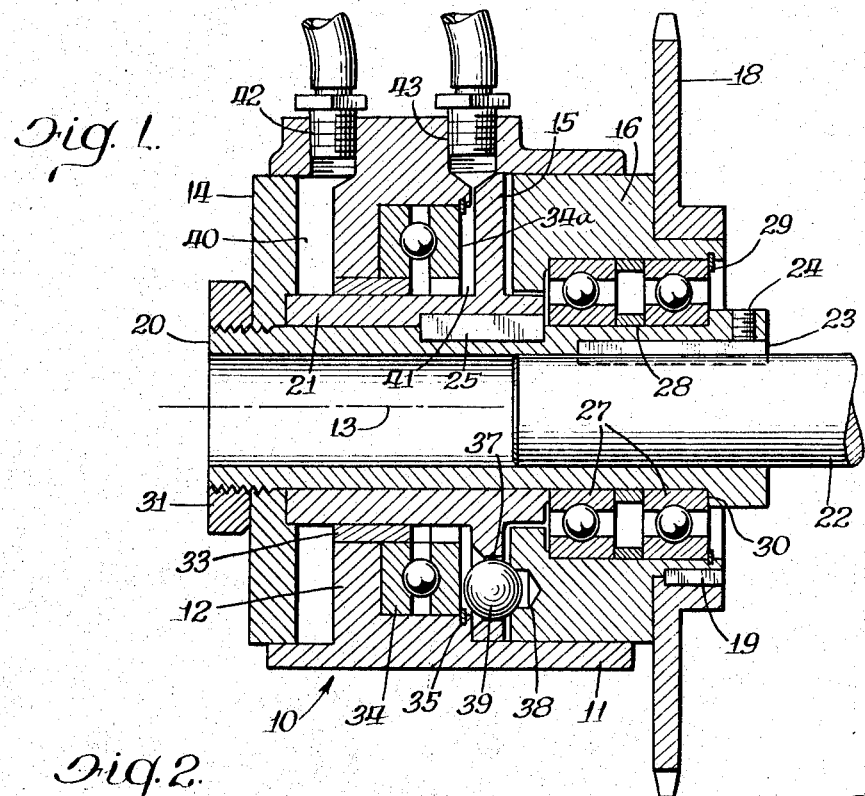
FIGURE 1 is a section through an embodiment of the present invention when transmitting power.
Figure 2:
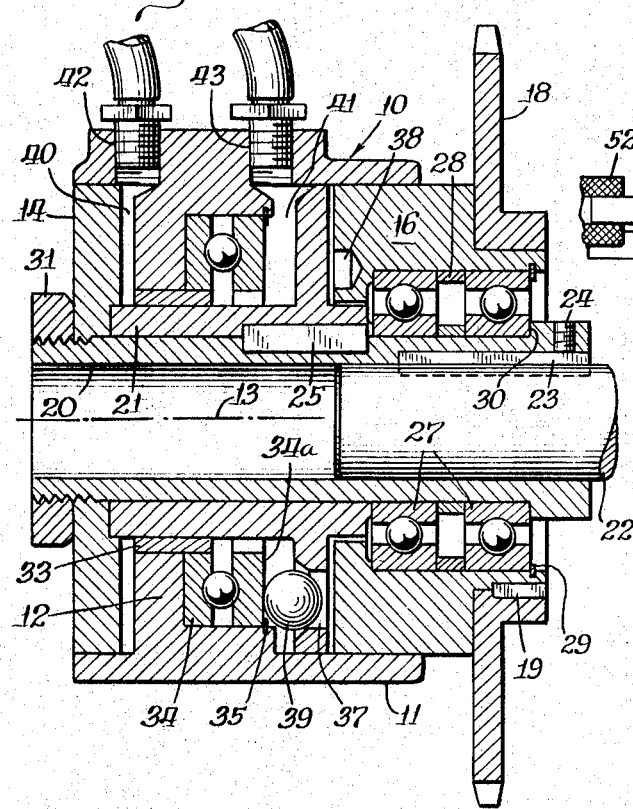
FIGURE 2 is a view corresponding to FIGURE 1 except illustrating the clutch in disengaged position.

Referring to the embodiment of FIGURES 1 and 2, the clutch includes a housing generally 10 comprising annular shell 11 and a cylindrical member 12 normal to the axis 13 of the clutch. There is an input member comprising plates 14 and 15 and an output member 16. A sprocket 18 is secured to output member 16 by means of a key 19. The input member also includes an inner sleeve 20 and an outer sleeve 21. Inner sleeve 20 is secured to an input or driving shaft 22 by means of a key 23 held in place by a set screw 24. A key 25 connects inner sleeve 20 to outer sleeve 21.

Output member 16 is rotatably mounted on inner sleeve 20 by means of ball bearings 27. The two bearings 27 are positioned by a spacer 28 and a C-ring 29. The outer bearing 27 is held against an abutment 30 on inner sleeve 20. At the opposite end the parts are held in place by a nut 31 threaded onto the inner sleeve 20.

A sleeve bearing 33 is mounted between the outer sleeve 21 of the input member and cylindrical member 12 of the housing. A ball bearing 34 is held in place in the housing by a C-ring 35. Side 34a of bearing 34 forms a pressure face or wall of the housing for the purpose to be subsequently described.

Plate 15 of the input member has a plurality of detent openings 37 extending therethrough parallel to axis 13. Output member 16 has a plurality of recesses 38 which correspond in number and position to the detent openings 37. In each opening is a ball detent 39. The exact number and positioning of the detent openings and recesses can be varied to suit the particular structure. If more than one is employed, their angular or radial position should be varied so that they do not mate with each other except at one angular position of the input member with respect to the output member.

The housing and input member defines two fluid chambers 40 and 41. A fluid connection 42 is provided for chamber 40 while a fluid connection 43 communicates with chamber 41.

Figure 3:
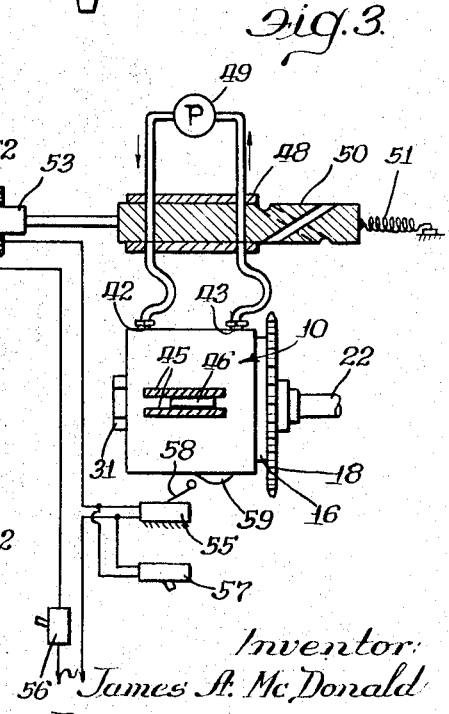
FIGURE 3 is a schematic diagram illustrating the associated apparatus for obtaining disengagement of the clutch.

Referring to FIGURE 3 means are provided to permit housing 10 to move axially while restraining it against rotational movement. This may comprise a pair of parts 45 of a frame. Parts 45 define a way within which is received a boss 46 of housing 10.

A directional control valve 48 is connected between a source of compressible fluid under pressure, as represented by a pump 49, and fluid connections 42 and 43. Valve 48 has a spool 50 which in one position directs the compressible fluid under pressure to chamber 40, and in the other position would direct the compressible fluid under pressure to chamber 41. A spring 51 urges the spool towards the one position. The spool may be moved to the other position by electrical means as represented by solenoid 52 and its armature 53 connected to the spool. A normally open switch 55 is connected in series with solenoid 52, with a normally closed switch 56 and a source of electrical power. A normally open, manually operable, switch 57 is connected in parallel with switch 55. Switch 55 has an operating finger 58 positioned to be actuated by an abutment 59 on housing 10 as the housing is moved by reason of an overload.

The power transmitting position of the clutch is illustrated in FIGURE 1. The detent 39 is seated in recess 38 to lock the input member to the output member. Fluid pressure is applied to chamber 40, thus holding wall 34a of the housing against ball 39 to maintain the ball in seated position in recess 38. The magnitude of the fluid pressure in chamber 40 will be a determining factor in the amount of torque that must be developed before the clutch disengages.

When an overload occurs, ball 39 is forced out of recess 38 causing housing 10 to move to the left against the fluid pressure of chamber 40. This movement causes abutment 59 to actuate switch 55. Thus, switch 55 is closed energizing solenoid 52. Switch 55 may be positioned to be actuated when ball 35 has been moved only partially out of recess 38 and before the clutch is completely disengaged. Upon solenoid 52 being energized it attracts armature 53 changing the position of spool 50 of valve 48. The solenoid 52 also can be energized by the actuation of switch 57 to similarly change the position of the spool of valve 48. In the changed position, fluid pressure is applied to chamber 41 and cut off from chamber 40. Thus, there is developed a positive force to shift housing 10 to the left to the position illustrated in FIGURE 2. In this position the output member 16 is free to rotate with respect to the input member. There are no forces present tending to urge detent 39 back into recess 38. Thus there is not the hammering of the detents reseating with each revolution of the clutch as occurs in many prior art overload clutches.

At such time as the trouble has been corrected and the overload eliminated, switch 56 is opened to deenergize solenoid 52. Thereupon spool 50 returns to its original position in response to the urging of spring 51. Fluid pressure now is applied to chamber 40 while being removed from chamber 41. This causes wall 34a to bear against detents 39. As recess 38 again aligns with opening 37, detent 39 will be forced into the recess to reengage the clutch.

The embodiment of FIGURES 4 and 5 comprises a housing generally 65 formed by a cylindrical shell 66 with an integral cylindrical end member 67 and a cap member 68. Cap member 68 is secured to the remainder of the housing by a plurality of screws 69. Within housing 65 is an input member 71 and an output member 72. Input member 71 comprises a sleeve 73 and a cylindrical plate 74. A key 75, held in place by a set screw 76, secures sleeve 73 to an input shaft 77. Similarly, output member 72 comprises a plate 78 and a sleeve 79. Sleeve 79 is secured to output shaft 80 by a key 81 held in place by a set screw 82.

A bearing 85 rotatably connects sleeve 79 and shaft 77. In turn sleeve 79 is journaled in a bearing 86 fitted in cap member 68. Sleeve 73 is journaled in a bearing 87 in end member 67 of the housing. A seal 88 about sleeve 79 is held in cap member 68 by a C-ring 89. A C-ring 90 holds a seal 91, which fits about sleeve 73, in end member 67 of the housing. A ball bearing 92 is held in place in the housing by a C-ring 93. Bearing 92 forms a part of the housing and defines a wall 92a for contact with the detents.

Input member 71 has a plurality of openings 95 aligned with the axis of the two shafts. For each opening 95, the output member 72 has a corresponding recess 96. Ball detents 97 are received in each of the openings 95.

The housing 65 defines a cylinder which is divided into two chambers 99 and 100 by the input and output members which act as a piston therein. Chamber 99 has a fluid connection 101 and chamber 100 has a fluid connection 102. The fluid line to connection 42 in FIGURE 3 would be connected to connection 101 in FIGURE 4. The fluid line to connection 43 of FIGURE 3 is connected to connection 102 of FIGURE 4. Housing 65 is restrained against a rotational movement while permitting it to move axially of shafts 77 and 80.

FIGURE 4 illustrates the clutch in engaged position with fluid pressure being applied to chamber 99. Detent 97 is seated in recess 96 locking the input and output members together. When an overload occurs, detent 97 is forced out of recess 96, thus shifting housing 65 to actuate switch 55 (of FIGURE 3). As hereinbefore described, this repositions valve 48 so that fluid pressure is removed from chamber 99 and applied to chamber 100. The fluid pressure in chamber 100 forces the housing to the left to the FIGURE 5 position. In doing so, a brake plate 104 on housing cap member 68 is forced into contact with output member 72. This immediately stops the rotation of the output member and of shaft 80. Input member 71 can continue to rotate freely. As in the previous embodiment there are no forces present tending to jam detent 97 back into recess 96. When the clutch is to be reengaged, fluid pressure is shifted from chamber 100 to chamber 99 thus forcing wall 92a of the housing against the detents 97. As soon as the detents align with recesses 96, the pressure of wall 92a on detents 97 forces those detents to seat into the recesses, with the clutch then being reengaged in the position illustrated in FIGURE 4.

I claim:

1. A clutch including: a housing defining a fluid chamber; an input member and an output member in said chamber, said members being coaxially positioned and mounted for rotation in said chamber, a first of said members having detent means and the second member having recesses to mate with and receive said detent means to rotatably engage the two members, provision being made for relative axial movement between the housing and one of said members, said one member defining a piston in said chamber; and separate fluid connections communicating with said chamber at opposite sides of said one member respectively.

2. A clutch for use with a source of compressible fluid under pressure including: power input and output means, one of said means comprising a plate rotatable about an axis and having a detent aperture therethrough from one side to the other, the other of said means comprising a member rotatable about said axis and having a detent receiving opening aligned with said aperture, said member being at one side of said plate; a detent in said aperture, projecting into said aligned opening at said one side of said plate and projecting beyond said plate at the other side thereof; and a housing about said member and having a wall in juxtaposition to the other side of the plate and in contact with the projecting part of the detent, said housing being movable axially with respect to said plate, said housing and said plate defining an expansible chamber therebetween, said housing and said means defining a second chamber which decreases in size as said housing is moved with respect to said plate, said housing having separate fluid connections communicating respectively with the respective chambers.

3. A clutch as set forth in claim 2, wherein said plate has a plurality of apertures and said member has a plurality of openings, and including a plurality of detents, said detents being spherical.

4. A clutch as set forth in claim 3, wherein said housing includes a thrust bearing defining said wall.

5. A clutch as set forth in claim 3 including valve means connected to said source and to said chambers to selectively apply fluid from said source to one or the other of the chambers.

6. A clutch as set forth in claim 5, including means connected to said valve means and operatively associated with said housing to apply pressure to said expansible chamber in response to movement of the housing in a direction such as to expand said expansible chamber.

7. A clutch for use with a source of compressible fluid under pressure including: a housing including means adapted to restrain the housing against rotation about an axis while permitting an axial movement thereof, and a cylindrical member having a wall normal to the axis; an input power member rotatably mounted with respect to the housing; an output power member rotatably mounted with respect to the housing; said housing and power members defining two fluid chambers one of which expands and the other of which contracts as said housing is moved in a given axial direction; one of said power members being in juxtaposition to said wall and having an opening therethrough parallel to said axis; the other of said power members having a portion in juxtaposition to said one power member at the side of said one power member opposite said wall and having a detent receiving recess in axial alignment with said opening; a detent in said opening and seated in said recess; and fluid connections communicating with said chambers respectively.

8. A clutch as set forth in claim 7, wherein a member defining a part of the other chamber has a brake plate positioned to contact another member defining a part of the other chamber when said housing is moved in said direction.

9. A clutch as set forth in claim 7, wherein said member of said housing is between said other power member and a part of said one power member.

10. A clutch as set forth in claim 7, wherein said housing defines an enclosed cylinder and said power members are positioned in said cylinder.

11. A clutch as set forth in claim 7, including control means having a directional-control valve communicating with said source and with said connections to direct the fluid to said other chamber, and means operatively associated with said housing and connected to said valve to disrupt the flow of fluid to the other chamber and to direct it to the one chamber upon movement of the housing in said direction.

12. A clutch as set forth in claim 11, wherein said control means includes a manually operable device connected to said valve to change the flow of fluid from said other chamber to said one chamber.

References Cited by the Examiner
UNITED STATES PATENTS

| | | | |
|---|---|---|---|
| 2,963,134 | 12/1960 | Banner | 192—56 |
| 3,016,118 | 1/1962 | Zatsky | 192—18.2 |
| 3,155,040 | 11/1964 | Shurts et al. | |
| 3,205,986 | 9/1965 | Kramer | 192—56 |

DAVID J. WILLIAMOWSKY, *Primary Examiner.*

A. T. McKEON, *Assistant Examiner.*